INVENTORS
LEWIS H. BRAKEL
JOHN B. JONES JR.
BY *Homer H. Sweet*
ATTORNEY

Jan. 1, 1963 L. H. BRAKEL ET AL 3,071,230
ANTI-SEGREGATION CHARGE FEEDER FOR SHAFT KILNS AND THE LIKE
Filed Feb. 26, 1960 2 Sheets-Sheet 2

INVENTORS
LEWIS H. BRAKEL
JOHN B. JONES JR.
BY
ATTORNEY

United States Patent Office 3,071,230
Patented Jan. 1, 1963

3,071,230
ANTI-SEGREGATION CHARGE FEEDER FOR
SHAFT KILNS AND THE LIKE
Lewis H. Brakel, Seattle, Wash., and John B. Jones, Jr., Denver, Colo., assignors to Cameron and Jones, Incorporated, Denver, Colo., a corporation of Colorado
Filed Feb. 26, 1960, Ser. No. 11,381
9 Claims. (Cl. 193—23)

This invention relates to shaft kilns and analogous equipment of wide significance in the industrial arts for the conditioning and treatment of various materials in granular, or other, discrete broken or comminuted form amenable to flow under the influence of gravity, and more particularly to such equipment as organized for the continuous gravity-induced translation of charge material downwardly therethrough in exposure to treating and conditioning influences thereto supplied, and has as an object to provide novel and improved means for efficiently and continuously feeding charge material to such equipment.

A further object of the invention is to provide novel and improved means for continuously feeding charge material to shaft kilns and analogous equipment with substantially uniform distribution of the infeed throughout the transverse area of the receiving vessel.

A further object of the invention is to provide novel and improved means for continuously feeding charge material to shaft kilns and analogous equipment with substantial elimination of material particle size segregation interiorly of the receiving vessel.

A further object of the invention is to provide novel and improved means for continuously feeding charge material to shaft kilns and analogous equipment in a manner effective to minimize decrepitation of the material subject to heat interiorly of the receiving vessel.

A further object of the invention is to provide novel and improved charge feeding means for shaft kilns and analogous equipment that is efficiently adaptable to co-action with receiving vessels diversely circular, rectangular, or square in transverse outline.

A further object of the invention is to provide novel and improved charge feeding means for shaft kilns and analogous equipment that is efficiently operable to distributively deliver interiorly of an associated receiving vessel solids of diverse nature in any physical form and particle size amenable to translatory flow under the influence of gravity.

A further object of the invention is to provide novel and improved charge feeding means for shaft kilns and analogous equipment that is susceptible of expedient operative correlation with conventional such equipment and the conventional associated facilities for supply of charge material thereto.

A further object of the invention is to provide novel and improved charge feeding means for shaft kilns and analogous equipment that is continuously and regulatably automatic in operation.

A further object of the invention is to provide a novel and improved construction and operative interrelation of elements constituting an anti-segregation charge feeder for shaft kilns and analogous equipment of diverse conventional form and particularity.

A further object of the invention is to provide a novel and improved anti-segregation charge feeder for shaft kilns and analogous equipment that is expedient of production and operative installation in adaptation to particular requirements and environments, that is capable of sustained continuous operation with a minimum of servicing and maintenance, and that is positive and efficient in attainment of the ends for which designed.

With the foregoing and other objects in view, our invention consists in the construction, arrangement, and operative combination of elements as hereinafter set forth, pointed out in our claims, and illustrated by the accompanying drawings, in which—

Shaft kilns, and analogous equipment, for the confinement and direction of a charge of discrete solids material continuously passed therethrough under the influence of gravity in exposure to treating and conditioning influences, such as heat, supplied thereto are conventional industrial facilities extensively utilized, usually as large-capacity units, in some diversity of structural and operative particularity. Common to all such equipment is the practice of continuously feeding the charge material through the upper end of a receiving vessel in a quantity and at a rate to maintain the vessel interior transversely filled with a material charge of substantial depth and of continuously removing lowermost components of the charge through the lower end of the vessel. Manifestly, effectiveness of the material treatment accomplished by such equipment is enhanced, in respects and for reasons well understood by those skilled in the pertinent art, by a uniform distribution of the charge material throughout all transverse zones of the vessel so effectuated as to obviate peaking and piling of the infeed to the vessel and to inhibit segregation of the infeed according to particle size, and the instant invention is hence directed to the provision of a charge feeder for such equipment operable to realize a uniform, non-segregated distribution of continuous infeed to the receiving vessel thereof.

Figure 1:
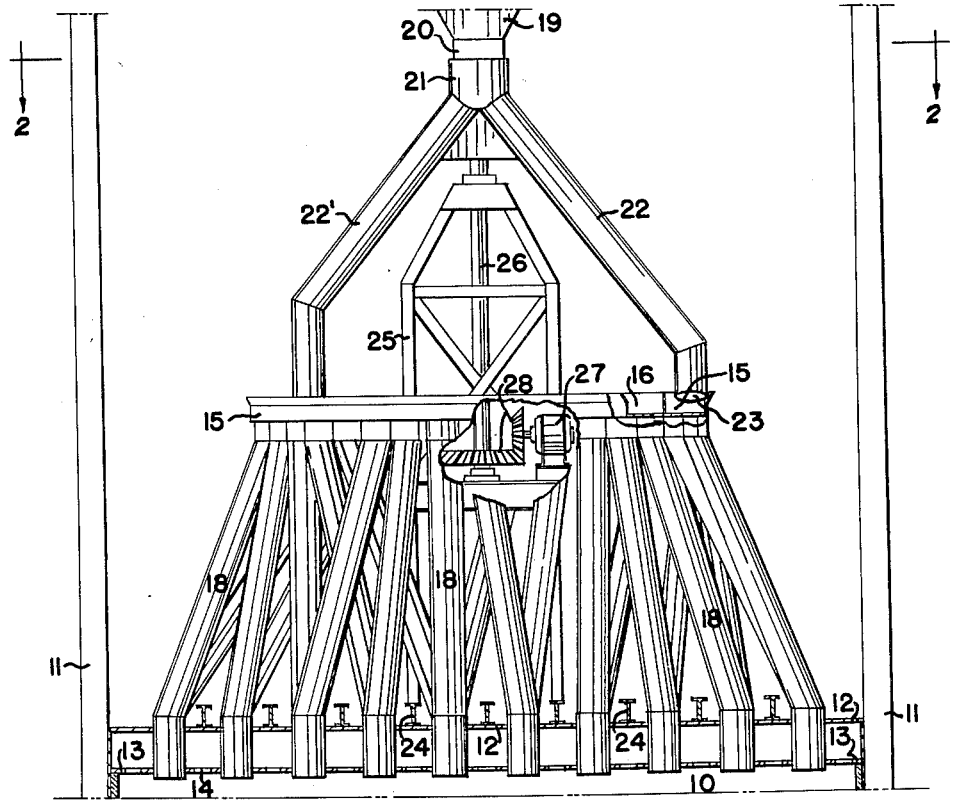
FIGURE 1 is a generally schematic, side elevational view of a typical embodiment of the improvements of the invention as operatively associated with a conventional transversely-rectangular shaft kiln, or other, receiving vessel fragmentarily represented, portions of the illustrated construction being broken away to disclose otherwise concealed arrangements.
Figure 3:
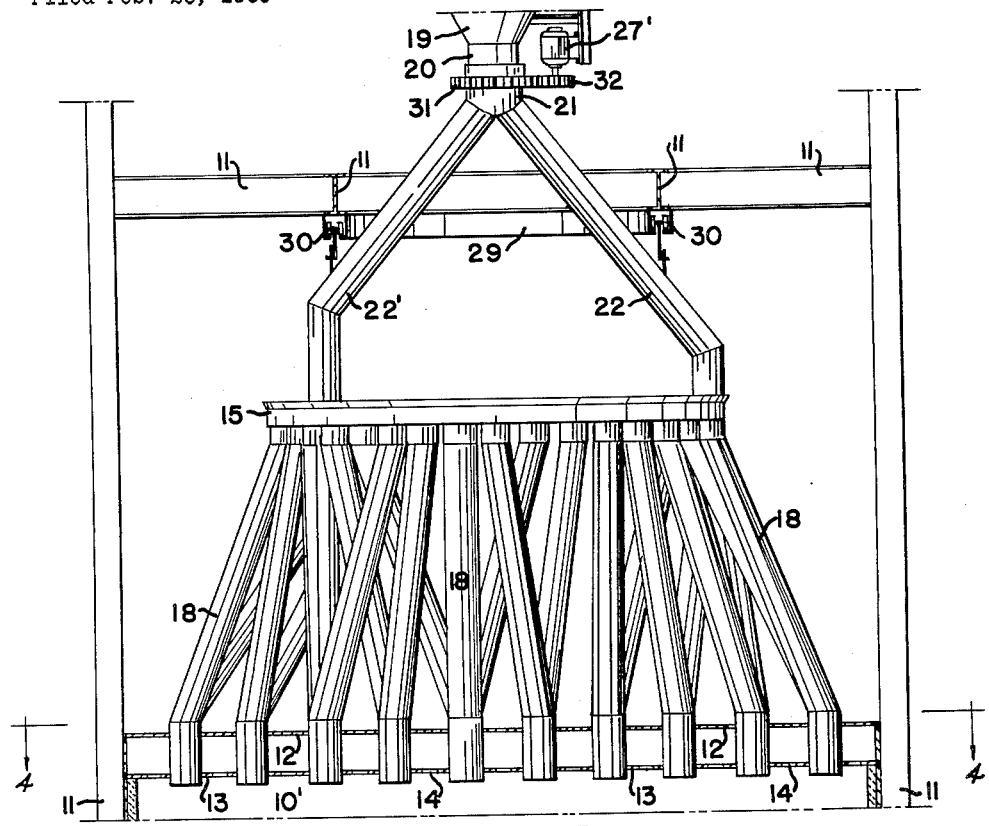
FIGURE 3 is a schematic, side elevational view, similar to FIGURE 1, of a typical adaptation of the improvements of the invention to use with a receiving vessel of circular outline.

Typical of the conventional shaft kiln, or other, equipment wherewith the improvements of the invention are adapted to be advantageously associated, the upper end of a rectangular receiving vessel defining a straight-walled vertically-disposed well for the reception and gravity-translation of solids material is indicated at 10 in FIGURE 1 and the similar upper end portion of an equivalent vessel of circular outline is indicated at 10' in FIGURE 3. In any feasible structural organization, the vessels 10 and 10' are sustained and supported in operating disposition by framing members 11, and in all adaptations of the invention to use with such vessels, or their functional equivalents, the upper end of the receiving vessel is transversely obstructed and closed, save as hereinafter set forth, by a fixedly-related structure similarly represented in FIGURES 1 and 3 as comprising spaced, parallel, complementary, upper and lower plate members 12 and 13, respectively, marginally sealed to and closing horizontally across each receiving vessel 10 and 10' at the upper end thereof to define therebetween a gas-collecting chamber to which access is had from below through ports 14 intersecting the plate 13 and from which exit may be provided by means of vents, not shown, disposed to open laterally of the structure from the space separating the said plate members. The particular organization of the structure typified by the plate members 12 and 13 is immaterial to the construction and operation of the features distinguishing the invention, it being sufficient to understanding and practice of the invention that a closure be provided in a generally-horizotal disposition transversely of the upper end of the receiving vessel, whatever be the transverse outline of the latter.

Figure 2:
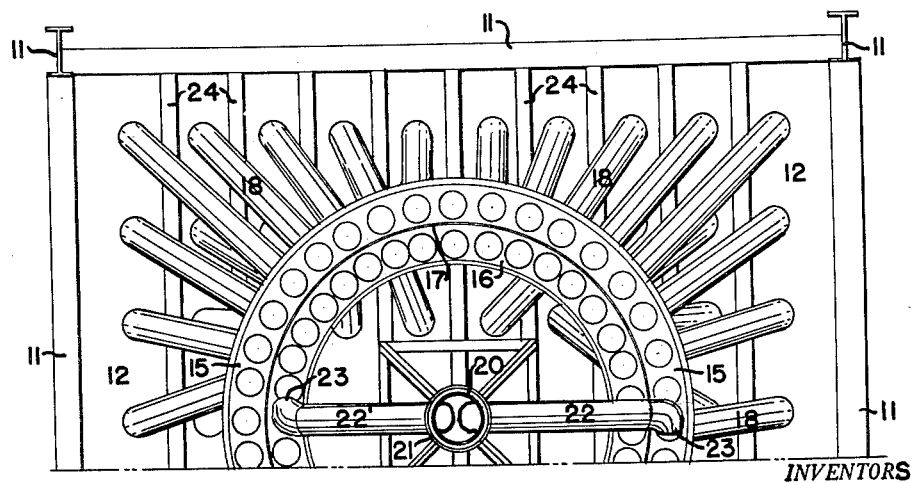
FIGURE 2 is a partial top plan view of the organization according to FIGURE 1 as projected from the plane indicated by the line 2—2 of said latter figure.
Figure 4:
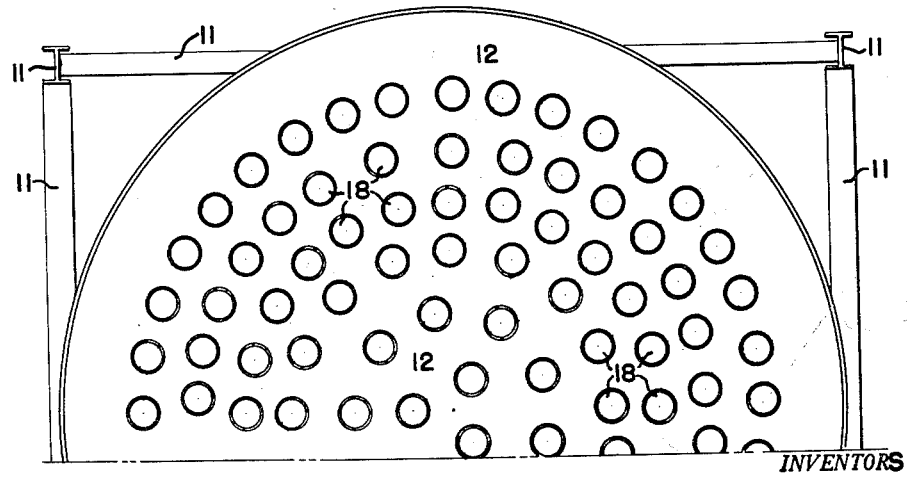
FIGURE 4 is a partial transverse section through the organization according to FIGURE 3 taken substantially on the indicated line 4—4 of said latter view.

Further common to both illustrated embodiments of the invention is the provision of a pair of concentric, upwardly-opening, annular troughs 15 and 16, essentially alike save as to radius, coplanarly juxtaposed at a joint wall 17, supported in centered registration with and spacedly above the associated vessel 10 or 10′ in a horizontal disposition paralleling the vessel upper end closure. Amenable to fixed support by any suitable means, the combined troughs 15 and 16 are expediently positioned by and carried on the upper ends of like tubular conduits 18 fixed to and individually opening through the floors of said troughs in a size and close succession such as to substantially appropriate the floor area of each trough with the upper end openings of the conduits, which latter depend from their connection with the troughs to and are individually sealed through the top closure of the associated vessel, such as the spaced plate members 12 and 13, to terminate as open delivery ends immediately subjacent the vessel top closure. As represented in FIGURES 2 and 4, the pattern of conduit 18 intersection with the vessel top closure is correlated with the size and transverse outline of the associated vessel to center the delivery ends of the individual conduits in substantially equal fractional areas of a zone transverse of the vessel open interior, and said conduits diversely incline in individual connection between the troughs and intersection with the vessel top closure to establish channels for the direction of gravity-induced material flow between each of the conduit open upper ends in the dual orbital succession thereof and a conduit delivery end of the vessel top closure pattern selected to promote uniform distribution of infeed through said conduits resulting from supply of material to the troughs 15 and 16 as hereinbelow described.

The solids material to be treated as an incident of continuous gravity-responsive translation through the vessel 10 or 10′ is conventionally supplied in discrete form of either uniform or varied particle size to an elevated hopper having a downwardly-convergent bottom 19 terminating in a downwardly-opening, tubular throat 20 concentrically registered with and spacedly above the troughs 15 and 16, which throat telescopically coacts with and delivers interiorly of an upwardly-opening, tubular sleeve 21 of a revoluble assembly characterized by similar tubular arms 22 and 22′ divergently extending from said sleeve to operative correlation with the troughs 15 and 16, respectively. Alike as to size and disposition accommodative of gravity-influenced solids material flow therethrough, the arms 22 and 22′ are fixed to the lower end of sleeve 21 and correspondingly open interiorly thereof to similarly receive and translate like portions of the material supply delivered through the throat 20, the lower, open ends of said arms revolubly registering with and for discharge within the troughs respectively served thereby and preferably terminating in outlets 23 disposed to trail in the direction of assembly rotation closely adjacent the trough floors. Paired in a common plane diametrically of the troughs 15 and 16, the arms 22 and 22′ in fixed association with the sleeve 21 comprise a unitary assembly adapted to be supported and powered for rotation about a vertical axis concentric with said troughs in any feasible manner. Where, as is usually the case with square or rectangular receiving vessels, structural members 24 are present in association with the vessel top closure, a tower 25 may be erected upon the members 24 to rise through the troughs and array of conduits 18 as a mount and support for a rotatable shaft 26 vertically coaxial with the troughs and sleeve 21 in fixed supporting relation with the revoluble assembly including said sleeve, and a prime mover, such as an electric motor 27, mounted upon the tower 25 in driving relation with said shaft through a gear box, or speed reducer, 28, may be operatively served with energy through conventional controls to effect rotation of said shaft and the assembly carried thereby in a customary and obvious manner operable to repetitiously sweep the outlets 23 of the arms 22 and 22′ orbitaly of the troughs which they serve for regularly uniform delivery of the material flow through said arms to the conduits 18 successively opening through the trough floors. Alternative to the mount for and drive of the revoluble assembly typified by the tower 25, a functionally equivalent arrangement adapted for use in situations to which the tower is not suited, as may be the case with transversely-circular receiving vessels, is represented in FIGURE 3 as comprising a circular track 29 fixedly supported concentric with and spacedly above the troughs 15 and 16 in parallel with the latter for the translatory accommodation of trolleys 30 fixed to and for the support of the assembly arms 22 and 22′, and a ring gear 31 fixed concentrically and exteriorly about the sleeve 21 in driven relation with a motor 27′ operatively mounted adjacent said sleeve through the agency of a pinion 32 on the power shaft of the motor.

As should be readily apparent from the foregoing, the improvements of the invention operate in either of the illustrated typical embodiments, or in any equivalent structural organization, to apply rotation of the sleeve 21 and arms 22 and 22′ at appropriate regulable speed for translation and distribution of charge material supply adequately present at the throat 20 through the agency of the troughs 15, 16 and conduits 18 to the interior of the receiving vessel as a patterned dispersion and correlation of infeed increments effective by virtue of optional conduit arrangement to maintain desired vessel charge of homogeneous, non-segregated character and substantially uniform density and permeability at appropriate depth and very nearly constant level in a manner very much facilitating the effectiveness of the treatments to which the material is exposed within the vessel.

Since changes, variations, and modifications in the form, construction, and arrangement of the elements shown and described may be had without departing from the spirit of our invention, we wish to be understood as being limited solely by the scope of the appended claims, rather than by any details of the illustrative showing and foregoing description.

We claim as our invention:

1. An anti-segregation charge feeder for shaft kilns and the like having a hollow, axially-vertical receiving vessel and a closure transversely obstructing the upper end of said vessel, comprising coplanar, upwardly-open, continuous, annular troughs superjacently paralleling said closure coaxially of said vessel, like, gravity-flow conduits operatively connecting between said troughs and spaced outlets opening separately to the vessel interior through said closure, means for the gravity supply of charge material centrally of and above said troughs, unitary transfer means rotatable concentrically of said troughs connecting said supply means with and for separate delivery of material to each of the troughs, and power means adapted to rotate said transfer means in maintained delivering coaction with the troughs for sustained simultaneous incharge of material to and orbitally of each trough.

2. An anti-segregation charge feeder for shaft kilns and the like having a hollow, axially-vertical receiving vessel and a closure transversely obstructing the upper end of said vessel, comprising coplanar, juxtaposed, upwardly-open, continuous, annular troughs superjacently paralleling said closure coaxially of said vessel, like, gravity-flow conduits operatively connecting between said troughs and spaced outlets opening separately to the vessel interior through said closure in a close orbital succession substantially appropriating the floor areas of said troughs, means for the gravity supply of charge material centrally of and above said troughs, unitary transfer means rotatable concentrically of said troughs connecting said supply means with and for separate delivery of material to each of the troughs, and power means adapted to rotate said transfer means in maintained delivering coaction with the troughs for sustained simultaneous incharge of material to and orbitally of each trough.

3. An anti-segregation charge feeder for shaft kilns and the like having a hollow, axially-vertical receiving vessel and a closure transversely obstructing the upper end of said vessel, comprising coplanar, juxtaposed, upwardly-open, continuous, annular troughs superjacently paralleling said closure coaxially of said vessel, like, gravity-flow conduits operatively connecting between said troughs and the vessel interior through said closure in a close orbital succession substantially appropriating the floor areas of said troughs and intersecting the full area of said closure in a patterned correlation of substantially uniform separation, means for the gravity supply of charge material centrally of and above said troughs, unitary transfer means rotatable concentrically of said troughs connecting said supply means with and for separte delivery of material to each of the troughs, and power means adapted to rotate said transfer means in maintained delivering coaction with the troughs for sustained simultaneous incharge of material to and orbitally of each trough.

4. An anti-segregation charge feeder for shaft kilns and the like having a hollow, axially-vertical receiving vessel and a closure transversely obstructing the upper end of said vessel, comprising a pair of coplanar, juxtaposed, upwardly-open, continuous, annular troughs superjacently paralleling said closure coaxially of said vessel, like, gravity-flow conduits operatively connecting between said troughs and the vessel interior through said closure in a close orbital succession substantially appropriating the floor areas of said troughs and intersecting the full area of said closure in a patterned correlation of substantially uniform separation, a tubular throat for the gravity supply of charge material centrally of and above said troughs, a sleeve rotatably and telescopically coacting with said throat to receive the discharge therethrough, hollow arms fixed as divergent extensions to and rotatable with said sleeve similarly connecting in angularly-spaced relation with and for separate delivery of material to the individual trough components of the juxtaposed pair, and power means adapted to rotate said sleeve and arms in maintained delivering coaction of the latter with the troughs for sustained simultaneous incharge of material to and orbitally of each trough.

5. The organization according to claim 4, wherein said hollow arms dependently diverge oppositely from said sleeve in a common vetical plane diametric of the troughs.

6. The organization according to claim 5, wherein said sleeve and the associated hollow arms are revolubly supported on a circular track concentrically paralleling said troughs for rotation in reaction to drive from a prime mover operatively applied through a ring gear fixed exteriorly of the sleeve.

7. The organization according to claim 4, wherein said conduits are substantially rigid in fixed engagement with the vessel upper end closure and with the troughs effective to position and support the latter in the relationship set forth.

8. The organization according to claim 4, wherein said hollow arms similarly terminate in outlets disposed to deliver interiorly of the associated trough in trailing relation with the direction of arm and sleeve rotation.

9. The organization according to claim 4, wherein said sleeve and the associated hollow arms are carried on a shaft supported by the vessel upper end closure for rotation coaxially of said troughs in reaction to drive from a prime mover operatively engaged therewith.

References Cited in the file of this patent
UNITED STATES PATENTS

| | | |
|---|---|---|
| 1,187,324 | Ibberson | June 13, 1916 |
| 1,413,505 | Stump | Apr. 18, 1922 |
| 2,583,488 | Leroy | Jan. 22, 1952 |
| 2,913,280 | Linquist | Nov. 17, 1959 |